No. 614,180. Patented Nov. 15, 1898.
J. U. ROBERTSON.
DOMESTIC GARBAGE CREMATOR.
(Application filed Nov. 29, 1897.)
(No Model.)

WITNESSES.
W. S. Rosenfield
Edw. C. Braden

J. U. Robertson, INVENTOR

UNITED STATES PATENT OFFICE.

JAMES U. ROBERTSON, OF PHILADELPHIA, PENNSYLVANIA, ASSIGNOR OF ONE-HALF TO EVAN M. VALENTINE, OF SAME PLACE.

DOMESTIC GARBAGE-CREMATOR.

SPECIFICATION forming part of Letters Patent No. 614,180, dated November 15, 1898.

Application filed November 29, 1897. Serial No. 660,087. (No model.)

*To all whom it may concern:*

Be it known that I, JAMES UNDERHILL ROBERTSON, a subject of the Queen of the United Kingdom of Great Britain and Ireland, residing at Philadelphia, State of Pennsylvania, have invented new and useful Improvements in Domestic Garbage-Cremators, of which the following is a specification.

The object of my invention is to provide a light, strong, and effective utensil for drying and burning upon the pot-hole of the stove or range the ordinary garbage or offal of the kitchen.

"Garbage," in the general acceptance of the term, means potato-peelings, vegetable matter of all kinds, beef and other bones, pieces of fat, cuttings and entrails of fish and fowl, and kitchen offal of every character. It is well known that such matter contains a large proportion of moisture and is not readily burned, except the fire be a very hot and active one. When thrown directly upon the fire, it deadens it and causes offensive odors, and the practice is unsatisfactory for many reasons.

By the construction illustrated in the accompanying drawings and explained in the following specification I attain my object by protruding the end of the vessel containing the garbage into the fire-chamber of the stove or range and directly over, but not into, the fire itself. In this position the garbage is subjected to the greatest heat generated by the fire, which dries and consumes it rapidly without in any degree deadening the fire, while the gases and other products of combustion are immediately carried by the draft up the chimney and into the upper air, where they are dissipated.

Figure 2:
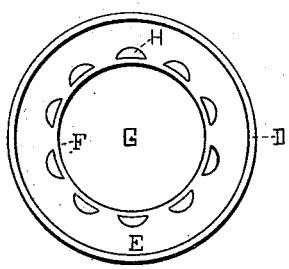
Figure 3:
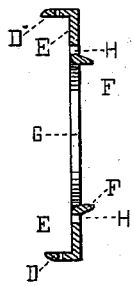
Figure 4:
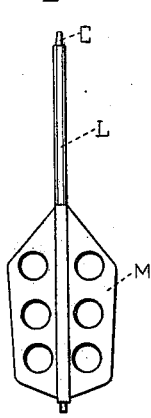
Figure 1:
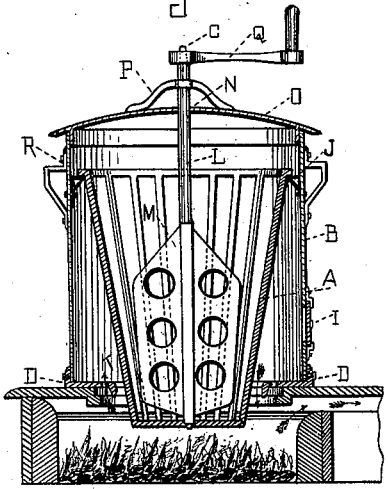
Figure 5:
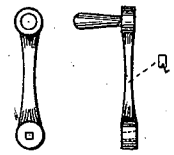
Figure 6:
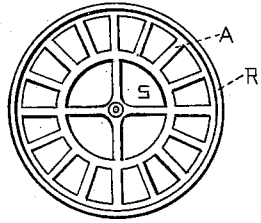
Figure 7:
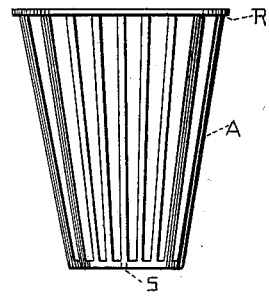

Referring to the drawings, Figure 1 is a vertical sectional view of my utensil, showing the garbage-receptacle A in place within the covered vessel B and also exhibiting the position of the agitator C. Fig. 2 is a plan view of the bottom of the containing vessel B. Fig. 3 is a cross-section of the same. Figs. 4 and 5 show details of the agitator C. Fig. 6 is a view of the bottom of the garbage-receptacle A. Fig. 7 is an upright view of the said receptacle itself.

In constructing my cremator I prefer to make the bottom piece of the outside vessel B of cast-iron. As shown in Figs. 2 and 3, said bottom piece consists of a flat rim E, provided with the two flanges D and F, surrounding a large circular opening G. The flange F fits into the pot-hole of the stove or range, while by means of the flange D the said bottom is joined to the upper part of the vessel B by rivets. As pot-holes run from six to nine inches in diameter as a rule, (the majority being seven inches and over,) I find it advisable to make no circular openings G of a greater diameter than seven inches, because that size will fit all pot-holes of seven inches diameter and above; but in order that freest communication may be had with the fire I pierce said flat rim E with a number of holes H close to the flange F, so that when the diameter of the pot-hole is over seven inches these holes H permit heat and other currents from the fire to enter said chamber B and to circulate around the garbage-receptacle A and return to the fire.

The upper part of the vessel B, I prefer to make of bloom-iron, for it will stand the heat, be durable, and take a high polish, making it a presentable object in the kitchen. Galvanized iron will not answer, because when it becomes hot the galvanizing runs and it loses color. A good-fitting ordinary cover having a proper rise is all that is necessary to complete this part of the apparatus. This outside vessel B is fitted with one or more draft-slides I. It is advantageous to have one of the same at the top of the cremator just under the shoulder J. When these draft-openings are uncovered at the proper time, they facilitate the burning of the garbage. Around the inside of said vessel B, near its top, I rivet a shoulder J to act as a seat or rest for the removable garbage-receptacle A. This is the only point of contact said garbage-receptacle has with said containing vessel, for at the bottom where it protrudes through the circular opening G a space K must be left for the free circulation of the currents of the fire into, through, and out of the covered vessel B.

The garbage-receptacle A is preferably made of cast-iron or of heavy wire in the shape of a conic frustum, as shown in Fig. 7. Being made of cast-iron, it soon becomes hot in every part, and it communicates its heat to the mass of garbage it contains, thereby drying it and preparing it for being burned to ashes when it falls to the bottom of said receptacle. This rapid drying and burning of the garbage is a very important feature of my cremator, for any device that takes hours to burn the garbage is practically useless, because it encumbers the stove and is very expensive for fuel. I prefer the sides of the garbage-receptacle to be straight bars running up and down, for this form, together with the shape, (conic frustum,) offers no obstruction to the garbage falling lower and lower in the receptacle as the process of combustion is carried on until it is all consumed. As it is burned, the ashes fall through the sides and out at the bottom into the fire-chamber of the stove. Around the top of said garbage-receptacle I form a rim or projection R, which rests upon the shoulder J and holds said receptacle in its place; but in order to hasten the burning process I provide the cremator with an agitator C, which consists of a shaft L, which carries a blade M of any proper pattern. Said shaft passes through a hole N made for it in the cover O of the outside vessel B, and also through the handle P. The crank Q, by which I rotate said agitator, is removable, in order that the cover O may be taken off and put on at pleasure. Said agitator-shaft L is stepped in a proper hole S at the bottom of the garbage-receptacle, and this step, together with the hole N in said cover, constitutes its bearings and holds it in place when it is to be operated. The object of the agitator is to disturb any ashes which may have become clogged at the bottom or sides, so that they may fall out into the fire below and allow the garbage above to be fed down. This hastens the burning of the same greatly and is a valuable adjunct to the cremator.

I am aware that kitchen utensils for burning garbage are constructed having double walls, while others have removable garbage-baskets, and others, again, have small holes or openings around the principal opening at the bottom. None of these constructions do I broadly claim; but

What I claim as new, and desire to secure by Letters Patent, is—

1. The combination in a domestic garbage-cremator with an outside containing vessel provided with a cover and with draft-openings having slides, of an inside removable garbage-receptacle, having the shape of a conic frustum, the periphery of which is vertical rods, and the bottom of which is open-work, in order that the ashes may fall through into the coal fire beneath, said receptacle being held in position by its flanged upper end engaging with and resting upon an adjoining seat on said containing vessel, while its lower end passes through and projects beyond an opening in the bottom of said containing vessel into the fire-chamber of the stove or range, without contact with the bottom of said vessel, but leaving sufficient space between itself and said bottom to permit the passage of heat-currents in and out of said cremator, substantially as described.

2. In a kitchen utensil for cremating garbage upon the pot-hole of a stove, the combination of an inside removable garbage-receptacle, having the shape of a conic frustum, the periphery of which is vertical rods and the bottom of which is open-work, in order that the ashes may fall through into the coal fire beneath, the end of which projects through the pot-hole into the fire-chamber of the stove, with an outside covered containing vessel, having a flanged circular opening at its bottom to fit said pot-hole, the utensil being provided with an agitator, substantially as described.

In testimony whereof I have hereunto set my hand in the presence of two subscribing witnesses.

JAS. U. ROBERTSON.

Witnesses:
E. M. VALENTINE,
EDW. C. BRADEN.